United States Patent
Orignac et al.

(10) Patent No.: US 6,621,971 B2
(45) Date of Patent: Sep. 16, 2003

(54) WAVEGUIDE STRUCTURE

(75) Inventors: Xavier Orignac, Bruchsal (FR); Norbert Fabricius, Hockenheim (DE); Wolfgang Foss, Kronau (DE)

(73) Assignee: JDS Uniphase Photonics GmbH & Co. (DE)

( * ) Notice: Subject to any disclaimer, the term of this patent is extended or adjusted under 35 U.S.C. 154(b) by 0 days.

(21) Appl. No.: 09/945,613

(22) Filed: Sep. 5, 2001

(65) Prior Publication Data

US 2002/0197041 A1 Dec. 26, 2002

Related U.S. Application Data

(60) Provisional application No. 60/299,194, filed on Jun. 20, 2001.

(51) Int. Cl.[7] .................................................. G02B 6/10
(52) U.S. Cl. ......................................... 385/129; 385/142
(58) Field of Search .......................... 385/129, 24, 130, 385/131, 132, 141, 142, 144

(56) References Cited

U.S. PATENT DOCUMENTS 5,526,453 A * 6/1996 Wolf et al. .................... 385/42
5,940,555 A   8/1999 Inaba et al. ................... 385/24
6,449,404 B1 * 9/2002 Paiam ........................... 385/16

FOREIGN PATENT DOCUMENTS

GB     2 346 452 A   *  9/2000  ............ G02B/6/16

OTHER PUBLICATIONS

"Ion–Exchanged Glass Waveguides: A review" Ramaswamy et al. Journal of Lightwave Technology, vol. 6, No. 6, Jun. 1988, pp. 984–1002.

* cited by examiner

*Primary Examiner*—Euncha Cherry
(74) *Attorney, Agent, or Firm*—Hall, Priddy, Myers & Vande Sande

(57) ABSTRACT

A glass planar waveguide structure, typically on a glass wafer or chip, has a core region, a contiguous narrow cladding region encompassing the core region, and an outer region practically extending over the rest of the wafer. The core region and the outer region are implanted with outside ions by ion diffusion, whereby the refractive index of the core and of the outer region are similar. The outer region forms an artificial waveguide to enhance the uniformity of physical properties of the wafer, e.g. stress, and reduce birefringence of the core.

9 Claims, 3 Drawing Sheets

WAVEGUIDE STRUCTURE

RELATED APPLICATIONS

This application claims priority from U.S. provisional application No. 60/299,194 filed Jun. 20, 2001.

TECHNICAL FIELD

This invention relates to waveguide structures embedded in a substrate, and more particularly, to planar and channel waveguide structures such as those employed in arrayed waveguide gratings (AWGs), specifically to waveguide structures manufactured by ion diffusion into a substrate to change locally the refractive index of the substrate.

BACKGROUND OF THE INVENTION

Planar waveguides and channel waveguides, usually made on a silicon substrate by deposition and etching or other semiconductor techniques, are commonly known in the art.

Ion exchange and other ion diffusion techniques have been receiving increased attention as methods to produce channel optical waveguides in glass and other materials. The importance of the resulting channel glass waveguides stems from their compatibility with optical fibers, potentially low cost, low propagation losses and other factors. However, while the deposition/etching approach produces a relatively well-defined refractive index profile in the core layer, it is virtually impossible to produce equally well-defined refractive index profile in glass substrate by ion diffusion techniques.

A typical diffusion process is exemplified by an ion-exchange process wherein a piece of glass or another suitable material (a wafer) is contacted (e.g. immersed) with a melt containing desired ions. The ions of the melt, e.g. $Ti^+$, $Cs^+$, $K^+$, $Li^+$, $Ag^+$, $Rb^+$ ions, chosen to have a higher polarizability than the ones of the wafer, are exchanged with ions from the wafer, typically $Na^+$. A review of the ion-exchange techniques is given by Ramaswamy et al., J. of Lightwave Technology, Vol. 6, No. 6, p.p. 984–1002, June 1998. Generally, the techniques include depositing a metallic mask, with slots made e.g. by photolithography, on the glass substrate, contacting the substrate with melt containing selected cations, and, once surface waveguide(s) is produced by ion exchange and diffusion, optionally an application of electromagnetic field to force the cations below the surface to produce "buried" waveguides.

The refractive index is locally increased in the substrate because of three factors: local change of the glass density, higher polarizability of the locally exchanged ions, and local stresses.

It is obvious, as can be seen in FIG. 1, that only a small fraction of the wafer surface is processed when making a conventional channel waveguide structure. From the viewpoint of the material, the waveguides can be considered as local defects in the wafer material composition. The physical properties of the wafer and the exchanged ions (birefringence, heat conductivity, heat capacity, diffusion constant and mobility) are locally modified in the areas where the ions were exchanged, i.e. where the waveguides were created. The result is that the optical properties of the waveguides (insertion loss) may not be uniform over the wafer (in one case the spatial change is between cladding and core region, in the other case, the spatial change is between core to core). Referring to FIG. 1, showing 6 couplers, the waveguides in the middle (2–5) all "see" the same environment (say, environment A). The two outer waveguides, on the other hand, both "see" a same environment B that is different than the A. Environment A consists of other waveguides, whereas environment B consists of waveguides on one side and semi-infinite cladding on the other side. This may result in different insertion losses and higher PDL (higher birefringence due to uneven stress increases the PDL) for the two groups of waveguides (four inner waveguides on ones side, and two outer waveguides on the other side).

It is an object of the invention to "equalize" environment A and environment B which would both tend to be infinite cores.

Another object of the invention will be evident from the following discussion comparing a slab waveguide and a channel waveguide. The ion density is bigger in one case (slab waveguide) than in the other. Since the diffusion constant and the mobility of the exchanged ions are concentration dependent, the diffusion equation will write differently in the two regions, resulting in different refractive index distributions. Since the heat conductivity and capacity are also concentration dependent, the heat diffusion equation will also write differently in the two regions, resulting in different temperature distributions (although both the slab and the channel region are poured in the melt having a uniform temperature, their thermal behaviour is different), thus in different refractive index distribution. In particular, under the same process conditions (same temperature, same E-field, same exchange time ...), a slab waveguide is buried deeper than its channel counterpart, due to the combined effects. It should be noted that the heat conductivity and heat capacity are wafer properties, whereas the diffusion constant and mobility are ion properties in a given wafer; the same ions have different diffusion constants and mobilities in different glasses, and different ions have different diffusion constants and mobilities when embedded in one common glass.

The presence of the local defects corresponding to the core region of the glass waveguide gives rise to undesired mechanical stress in the wafer. As a secondary issue, the use of a metallic mask on one surface wafer can also create stresses due to different thermal expansion coefficient of typical mask metals compared with that of glass, when the wafer with the mask are subjected to elevated temperatures of the melt.

It follows that it is desired to maintain as high as possible uniformity of the glass wafer waveguide. However, this is contradictory with the need to produce local "defects" in the wafer, the defects representing the core region.

It is desirable to maintain the optical properties of the waveguides as uniform as possible over the wafer. This is virtually equivalent to maintaining the glass material properties (e.g. composition, birefringence, heat conductivity, heat capacity) as uniform as possible over the wafer, which, in turn, is equivalent to maintaining the ion density as uniform as possible over the wafer.

U.S. Pat. No. 5,940,555 to Inaba et al. proposes an optical multiplexer/demultiplexer structure made on a quartz substrate by etching, the structure having a number of artificial channel waveguides adjacent an arrayed waveguide grating. The presence of the artificial waveguides is meant to reduce a variation and fluctuation in (etched) core width and to improve crosstalk characteristics of the grating.

SUMMARY OF THE INVENTION

In accordance with the present invention, there is provided a waveguide structure comprising:

a planar substrate, a waveguiding core region on the substrate comprising additional ions distributed over the core region at a first density range, a boundary region contiguous to and surrounding the core region, substantially devoid of additional ions and having a refractive index, the boundary region forming a cladding about the core, wherein the core region has a refractive index range, caused by and commensurate with the first ion density range, generally higher than the refractive index of the boundary region, and an outer region surrounding the boundary region and comprising the additional ions distributed over the outer region at a density range comparable with the first density range.

The term "additional ions" is used herein to denote ions from an outside source that have either been exchanged from the outside source with original ions of the substrate, or added (e.g. implanted) from an outside source without replacing original ions of the substrate. The additional ions should not be of the type already present in the substrate in any significant quantities.

In accordance with another aspect of the invention, there is provided a method of fabricating an optical waveguide circuit on a substrate, e.g. a chip or wafer, the method comprising the steps of supplying additional ions at a first density range into at least one waveguiding core region on the substrate, and supplying the additional ions at a second density range, comparable to the first density range, into a portion of the substrate isolated from the core region by a boundary region substantially devoid of additional ions.

The additional ions may be supplied by ion exchange or another ion diffusion process in which ions are diffused into and over the substrate.

The ions may be supplied into the respective regions of the substrate using a mask having at least one substantially ion-transparent region and an ion-opaque region, the at least one ion-transparent region of a shape corresponding to at least one waveguiding core, and the opaque region of a shape corresponding to the boundary region directly adjacent to the core.

BRIEF DESCRIPTION OF THE DRAWINGS

Further features and advantages of the present invention will become apparent from the following detailed description, taken in conjunction with the appended drawings, in which.

It will be noted that throughout the appended drawings, like features are identified by like reference numerals.

DETAILED DESCRIPTION OF THE PREFERRED EMBODIMENTS

As explained hereinabove, it is advantageous to reduce the birefringence of the glass wafer waveguide structure and to reduce the non-homogeneity of its insertion loss. In an initial glass wafer, before ions are exchanged or introduced from an outside source, the homogeneity is high and the uniformity of physical and optical properties is high across the surface of the wafer. The introduction of outside ions creates tensile or compressive stress in the region where the ions are implanted. The stress in turn causes undesirable birefringence. Further, mechanical and thermal properties (heat capacity and heat conductivity) of the wafer are changed as ions having different properties than the original ions are being implanted. These factors impact both the waveguide manufacturing process and the finished waveguide.

Figure 1:
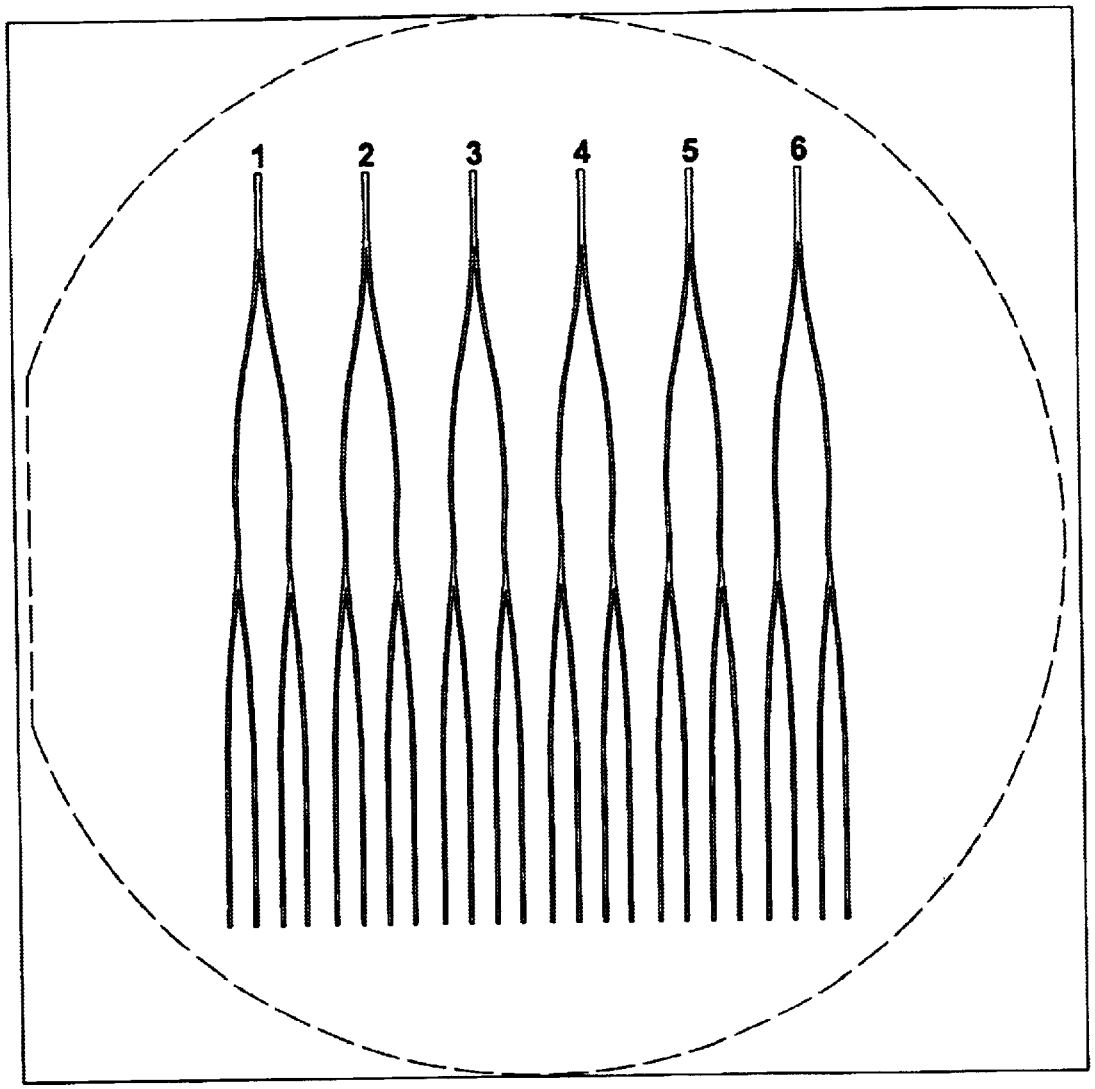
FIG. 1 illustrates a prior art mask design used in an ion-exchange waveguide making process.

As illustrated in FIG. 1, a typical mask 10 is made to cover a round wafer. The mask 10 has slots 12, made by a well-known lithography technique, the slots corresponding to six 1×4 splitters. Of course, the pattern could represent any other desired integrated optical circuit, of a non-linear shape. The slots are transparent to ion diffusion while the rest of the mask is opaque to ion diffusion.

It is obvious from FIG. 1 that, when the wafer with the mask thereon is subjected to ion exchange from a melt or to any other ion diffusion technique, only a very small fraction of the wafer surface will be implanted with the outside (additional) ions. The implanted regions will form iso-(refractive) index core lines i.e. waveguide cores. This is a desired result, but, as explained above, it will amount to creating local defects in the wafer material composition. The local properties of the wafer material (birefringence, heat conductivity, heat capacity etc.) are changed.

The invention reverses the conventional approach by proposing to treat as much of a wafer surface as possible to provide a relatively high uniformity of optical and physical properties across the surface of the wafer (substrate).

Figure 2:
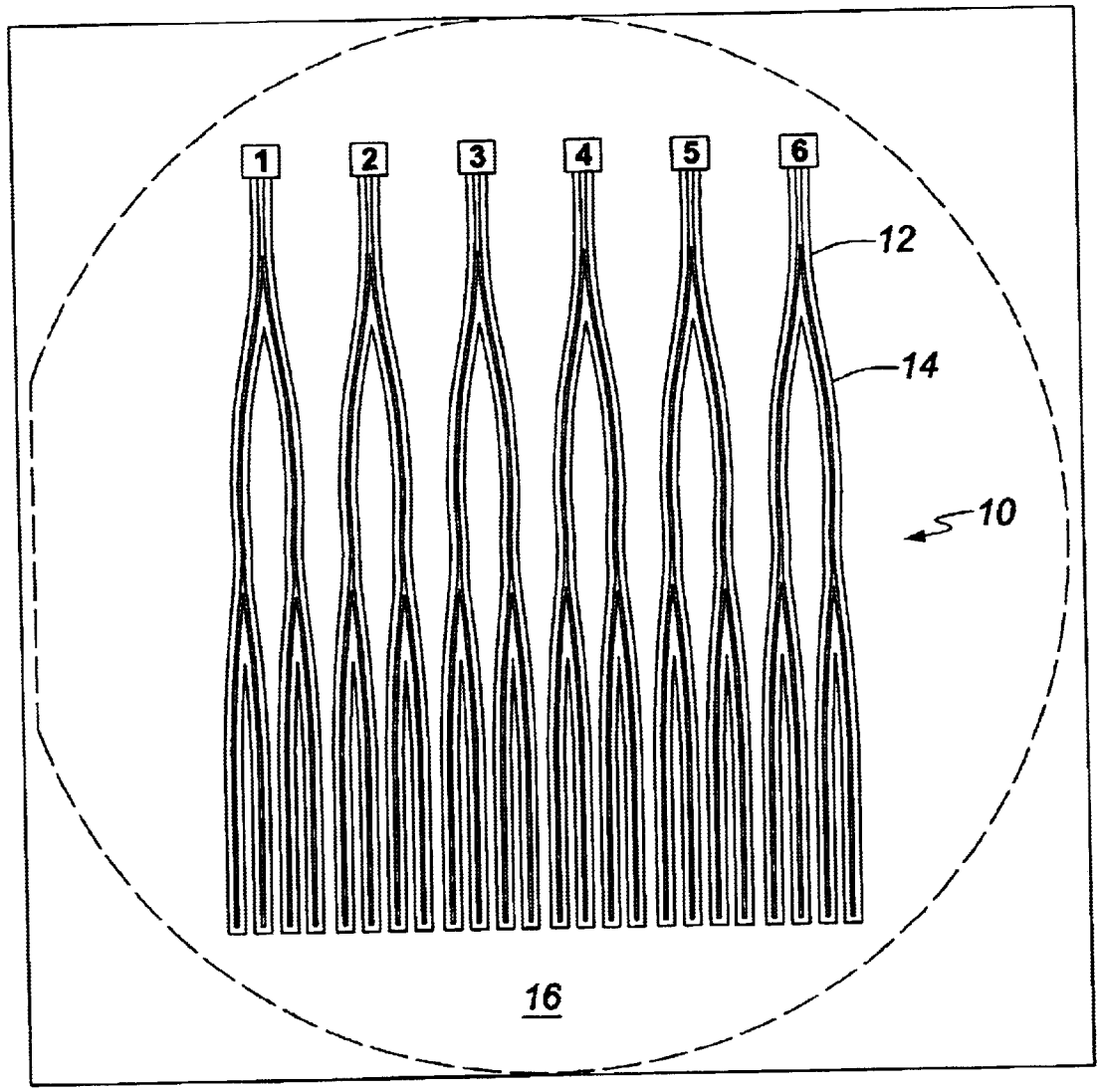
FIG. 2 illustrates a mask design according to the invention used in an ion-exchange waveguide making process.

FIG. 2 represents a mask design analogous to that of FIG. 1, but made according to the concept of the present invention. The mask, still having the narrow slots 12 corresponding to six 1×4 splitters, has a number of strip-like boundary regions 14, conforming in shape to the core profile 12, that are opaque to ion diffusion. The rest of the circular wafer 16 is not covered by the mask 10 and is therefore open, or transparent to ion diffusion when the wafer with the mask are exposed to ion exchange or another ion diffusion process.

As an added advantage, the mask of FIG. 2 only covers a small portion of the substrate and the difference in CTE between the mask and the substrate will be of lesser significance than with the use of the prior art mask (FIG. 1).

In the actual example, the slots 12 may have a width comparable to the width of a Atypical channel waveguide while the width of the boundary region strips 14 may be in the range of a few hundred $\mu$m to a few mm or more, dependent on requirements. The boundary region, of a shape corresponding to the shape of the core region, will serve as cladding for the core region corresponding to the slots 12 and will also separate the core region from the remaining part (outer region) of the wafer which will be implanted with approximately the same or at least comparable ion density as the core region.

This approach, in effect, is intended to create artificial planar waveguides separated from the core region(s) by the boundary region(s). It will be noted that the artificial (planar) waveguides are constituted by controlled ion density profiles of the additional ions diffused into the substrate (wafer) as opposed to additional etched channel waveguides of the Inaba et al. patent.

Figure 3:
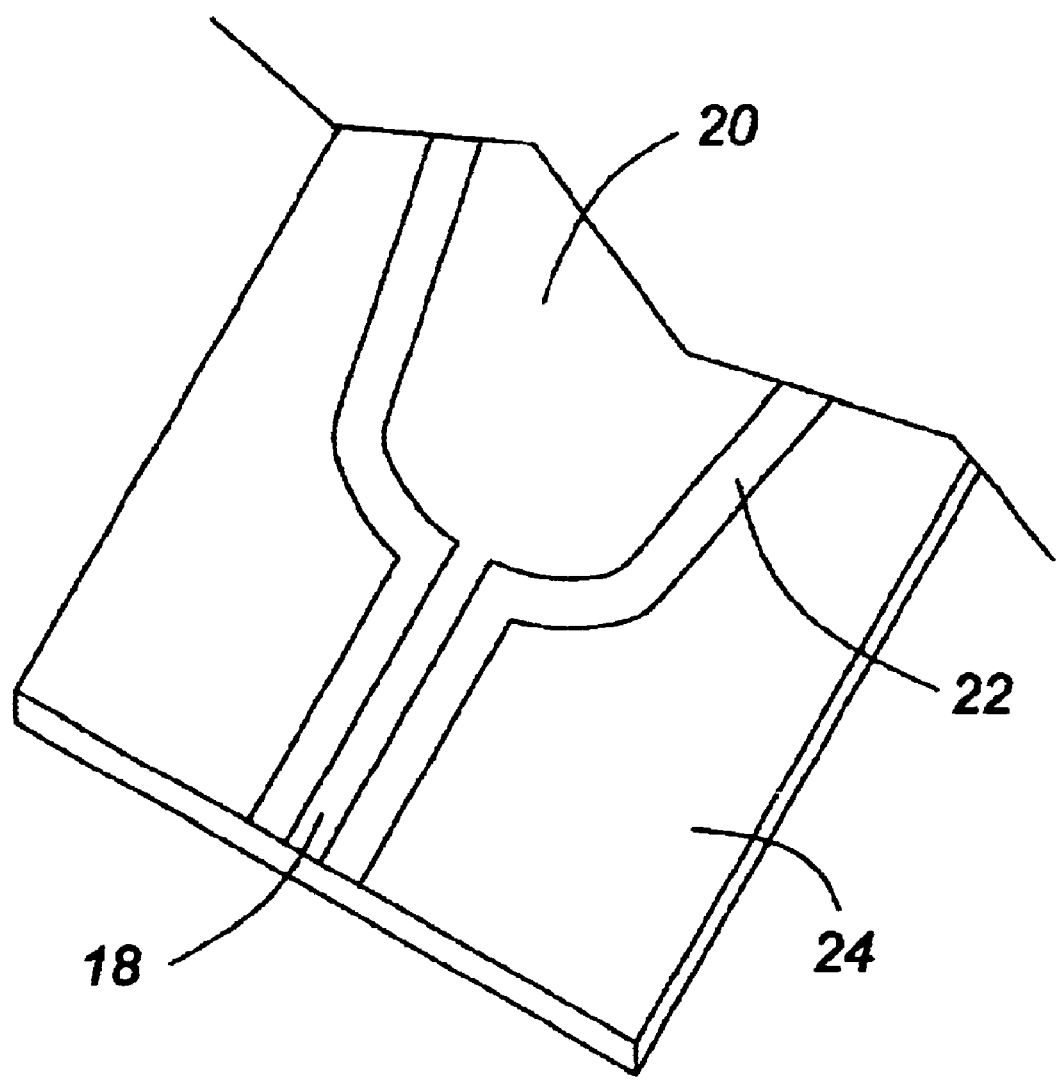
FIG. 3 is a partial view of an AWG made according to the present invention.

FIG. 3 illustrated the above point. According to the invention, a (partial) AWG waveguide structure would be formed with a channel waveguide 18 coupled to a slab waveguide 20, both waveguides exhibiting an elevated density of implanted ions and separated by a boundary region 22, substantially devoid of additional ions, from an artificial planar waveguide region 24 wherein the ion density, practically created by the same ions that are implanted into the core region 18, 20, is comparable to the ion density in the core region. It is feasible, even if not necessarily easy or practical, to implant different ions into the core region and the artificial waveguide region.

Notwithstanding this consideration, the substrate processed according to the method of the invention is likely to exhibit a higher uniformity optical properties of the waveguide (e.g. insertion loss) over the wafer. This can be achieved by a more uniform distribution of the physical properties (e.g. birefringence, heat capacity, heat conductivity, ion mobility, diffusion constants) of the material in which the waveguides are formed. This, in turn, can be achieved by a more uniform ion density than in conventional ion-diffusion channel waveguide structures.

As explained above, the diffusion behaviour of the ions in the slab waveguide portion of the wafer is different from the diffusion behaviour of the ions in the channel waveguides (due to different thermal behaviour of the two regions on one hand, and different diffusion constant and mobility of the ions on the other hand), resulting in different burial depths (location of the maximum of the refractive index profile) for the channel and the slab waveguide. The two refractive index profiles are different and they remain different even after the formation of the outer region according to the invention. However, with the conforming outer region, the two refractive index profiles can be expected to be at approximately the same depth which is an advantage of the invention.

The embodiments of the invention described above are intended to be exemplary only. The scope of the invention is therefore intended to be limited solely by the scope of the appended claims.

We claim:

1. A waveguide structure comprising:

a planar substrate having a major surface, a waveguiding core region in the substrate, the core region comprising additional ions distributed over the core region at a first density range, a boundary region in the substrate, contiguous with and adjacent the core region, substantially devoid of additional ions and having a refractive index, the boundary region forming a cladding about the core, wherein the core region has a refractive index range, caused by and commensurate with the first ion density range, generally higher than the refractive index of the boundary region, and an outer region in the substrate, adjacent the boundary region and comprising additional ions distributed over the outer region at a density range comparable with the first density range, wherein the outer region extends over the entire major surface of the substrate except the core region and the boundary region.

2. The structure of claim 1 wherein the additional ions in the core region are identical to the additional ions in the outer region.

3. The structure of claim 1 wherein the core region has a non-linear shape and the boundary region conforms in shape to the core region.

4. The structure of claim 1 wherein the outer region constitutes a planar waveguide having compapable physical properties with the core region.

5. A waveguide chip comprising:

a substrate having waveguides defined therein, the waveguides comprising each an ion exchanged core having a first refractive index range and a cladding conforming in shape to the core and having a refractive index generally lower than the first refractive index range, the cladding substantially devoid of exchanged ions, and an outer artificial waveguide region conforming in shape to the waveguides and bounding the waveguides, wherein said outer region is separated from each core region by the cladding and is substantially ion exchanged to provide enhanced homogeneity of the chip or lessening stress, the outer region extending over the substrate except the core or cores and the cladding.

6. A method of fabricating an optical waveguide structure on a planar substrate having a major or surface, the method comprising the steps of:

a) supplying additional ions at a first density range into at least one waveguiding core region on the substrate, and b) supplying additional ions at a second density range, comparable to the first density range, into portion of the substrate isolated from the core region by a boundary region substantially devoid of additional ions, the portion extending over the entire major surface of the substrate except the core region and the boundary region.

7. The method of claim 6 wherein the steps a) and b) are effected by ion diffusion from an outside source to the substrate.

8. The method of claim 7 wherein the steps a) and b) are effected by ion exchange.

9. The method of claim 6 wherein the first ion density range and the second density range are selected to reduce mechanical stress in the resulting waveguide structure.

* * * * *